United States Patent [19]

Doose

[11] Patent Number: 4,580,790

[45] Date of Patent: Apr. 8, 1986

[54] SINTERED POLYTETRAFLUOROETHYLENE COMPOSITE MATERIAL AND SEAL ASSEMBLY

[75] Inventor: Paul R. Doose, Los Angeles, Calif.

[73] Assignee: Hughes Aircraft Company, El Segundo, Calif.

[21] Appl. No.: 622,895

[22] Filed: Jun. 21, 1984

[51] Int. Cl.[4] .......................... F16J 15/20; C08L 27/12
[52] U.S. Cl. .................................... 277/228; 277/96.2; 277/DIG. 6; 524/546
[58] Field of Search ................. 524/546; 277/96, 96.2, 277/DIG. 6, 228

[56] References Cited

U.S. PATENT DOCUMENTS

| | | | |
|---|---|---|---|
| 2,400,099 | 5/1946 | Brubaker et al. | 277/DIG. 6 X |
| 2,593,582 | 4/1952 | Lontz et al. | 524/546 X |
| 3,067,135 | 12/1962 | Strub | 524/546 X |
| 3,438,932 | 4/1969 | Sieron | 524/546 X |
| 3,759,883 | 9/1973 | Mueller et al. | 524/546 X |
| 4,408,007 | 10/1983 | Kuhls et al. | 524/546 |

FOREIGN PATENT DOCUMENTS

| | | | |
|---|---|---|---|
| 2601647 | 7/1976 | Fed. Rep. of Germany | 524/546 |
| 52-66562 | 2/1977 | Japan | 524/546 |
| 52-15303 | 4/1977 | Japan | 524/546 |
| 575620 | 2/1946 | United Kingdom | 277/DIG. 6 |
| 903090 | 8/1962 | United Kingdom | 524/546 |
| 917223 | 1/1963 | United Kingdom | 524/546 |
| 1167834 | 10/1969 | United Kingdom | 524/546 |

*Primary Examiner*—Robert S. Ward
*Attorney, Agent, or Firm*—A. W. Karambelas

[57] ABSTRACT

A composition of matter adapted for use as a sealing material and in fabricating bushings, rider rings and structural support pads. The composition is sintered polytetrafluoroethylene (PTFE) having uniformly dispersed therein from 5 to 50 volume percent of filler particles selected from the group consisting of glass particles and mineral particles having a Rockwell C hardness of between 10 C to 50 C wherein the filler particles are present in the polytetrafluoroethylene when the sintering occurs. Lead glass, soda-lead glass and soda-lime glass are among the filler particles which are incorporated into the PTFE to form structurally strong compositions which generate low amounts of wear debris.

20 Claims, No Drawings

SINTERED POLYTETRAFLUOROETHYLENE COMPOSITE MATERIAL AND SEAL ASSEMBLY

BACKGROUND OF THE INVENTION

The present invention relates generally to polytetrafluoroethylene (PTFE) and filler materials incorporated into the PTFE when making PTFE seals, bushings, rider rings, support pads and other articles. More particularly, the present invention relates to improved polytetrafluoroethylene (PTFE) composite materials in which relatively soft glass or mineral particles are used as the filler material.

PTFE is a particularly versatile polymer material which has many industrial and domestic uses. PTFE has become a particularly popular material for use in fabricating seals, brushing, rider rings and support pads due to its inherently low coefficient of friction, electrical insulating properties and resistance to chemical attack. PTFE based materials are especially well-suited for use with relatively reciprocating and/or rotating surfaces. For example, PTFE bushing or seals are particularly popular for use with rotating shafts and PTFE based rider rings are popular for sealing reciprocating pistons such as those commonly found in pumps, compressors and other relatively low temperature piston operated apparatus. PTFE based materials have also found wide use a bearing pads used to support bridges and high rise buildings.

A basic problem with articles made from pure PTFE seals is that although the impact strength of pure PTFE is high, the tensile strength, wear resistance and creep resistance are low in comparison to other engineering plastics. In order to structurally strengthen the PTFE, it has been common practice to incorporate various filler materials such as hard glass fibers, bronze, carbon and graphite into the pure PTFE. These filler materials are designed to prevent the PTFE from becoming deformed during continued use and to provide additional desired characteristics not available when the seals or other articles are made from pure PTFE alone.

A typical glass filler material which has been widely used in the past is a relatively hard glass material which is marketed by the Owens Corning Corporation under the trade name E-Glass. E-Glass is a well-known glass product which is commercially available in a wide variety of forms. E-Glass is usually sold as continuous fibers or chopped fibers which are incorporated into numerous different polymer products to form a wide variety or structurally strong materials. PTFE seals which incorporate E-Glass are resistant to cold creep and are not easily deformed; however the tensile strength of PTFE filled with E-Glass is lower than pure PTFE. Also, E-Glass is a particularly hard glass having a Rockwell C hardness of roughly 65C. When PTFE seals utilizing E-Glass as the filler material are used as a seal or support between metal parts or other materials having a similar or lower hardness than the E-Glass, considerable wear debris is generated during movement of the parts. This is an especially critical problem in expensive compressor and pump equipment where the generation of wear debris between the E-Glass reinforced PTFE and metal parts results in premature failure of the equipment requiring tear-down, inspection and rebuilding of the apparatus.

It would be desirable to provide a PTFE material having a suitable alternative filler material which provides adequate structural strength to the PTFE and resistance to cold creep, while at the same time limiting the amount of wear debris generated between the PTFE and the surfaces which rub against the PTFE during operation of the equipment.

SUMMARY OF THE INVENTION

In accordance with the present invention, a composite PTFE material is provided which is structurally as strong or stronger than PTFE filled with E-Glass and which generates significantly less wear debris than seals, bushings and rider rings made from PTFE filled with E-Glass.

The present invention is based on a composition of matter which includes sintered PTFE containing uniformly dispersed therein from 5 to 50 volume percent of filler particles selected from the group consisting of glass or mineral particles having a Rockwell C hardness of between about 10C to 50C wherein the filler is present in the PTFE when the sintering occurs. Glass or mineral particles in this hardness range are relatively soft particles which are generally at least 10C softer than steel and steel alloys and other metals commonly used in hydraulic and compressor equipment. It was surprisingly discovered that these soft fillers provide the same or equivalent structural reinforcement provided by much harder E-Glass type fillers, while at the same time significantly reducing the amount of wear debris generated during operation of the equipment.

As one aspect of the present invention, soft glasses such as lead and/or soda-lead glass particles are incorporated into PTFE powder in amounts ranging from 13.2 to 74.3 weight percent for lead glass and 6.4 to 56.5 weight percent soda-lead glass. This corresponds to 5 to 50 volume percent lead glass and soda-lead glass, respectively in the final sintered PTFE. The fabrication of various articles from the PTFE powder/soft glass solids blend is carried out by conventional PTFE processing involving cold compression followed by sintering at elevated temperature. The sintering temperature in accordance with another aspect of the invention is maintained at or above the annealing point of the glass particles in the case of lead glasses. Such heating of the glass particles at or above their annealing point when in compressed contact with the PTFE powder is believed to be at least partially responsible for the unexpected structural strength imparted to the final filled PTFE by the soft glass.

As another feature of the present invention, PTFE filled with lead or soda-lead glass is sintered at temperatures above the melting point of lead in an oxygen free atmosphere wherein at least a portion of the lead oxide present in lead glass is reduced to metallic lead. Such treatment allows generation of metallic lead during the sintering step which can be allowed to migrate within the PTFE to form localized areas rich in lead or gradients of varying metallic lead concentrations within the PTFE at various locations. This provides a convenient means to vary the physical and chemical properties of the article at various locations within the article. As another aspect of the present invention, when soft minerals are used as the filler material, the minerals will have different hardness in different crystal lattice directions. As a result, the strength of the PTFE can be reinforced in one direction while remaining relatively soft in another direction to reduce generation of wear debris.

The above discussed and many other features and attendant advantages of the present invention will become apparent as the invention becomes better understood by reference to the following detailed description.

DETAILED DESCRIPTION OF THE INVENTION

The polytetrafluoroethylene (PTFE) composite compounds in accordance with the present invention have a wide variety of uses. The compounds of the invention may be fabricated into bushings, rider rings, and seals for use in compressors, hydraulic equipment and automobiles. Further, the compounds may be used to form bearing pads for bridges, pipe lines and high-rise buildings.

Although the filled PTFE compounds in accordance with the present invention may be used in a wide variety of applications, they are especially well-suited for use as bushings, rider rings and seals where it is desirable to limit the amount of wear debris generated during continual sliding or rotation of the filled PTFE against cylinder walls, rotating shafts, etc.

The filled PTFE compounds of the present invention are sintered PTFE having uniformly dispersed therein from 5 to 50 volume percent of filler particles wherein the filler particles are soft glass or soft mineral particles having a Rockwell C hardness of between about 10C and 50C. For the purposes of this specification, soft glasses and soft minerals will be those having a Rockwell C hardness of between 10C and 50C.

The filled PTFE is made according to conventional PTFE fabrication technique, in which granular or fine powdered PTFE is mixed with the selected filler particles and cold compressed to form an article of desired shape. The compressed mixture is then sintered at high temperatures (usually above 620° F.) to provide the desired composite material.

Any of the commercially available brands of PTFE may be used to make th PTFE composite. For example, PTFE available from E. I. DuPont Co. and sold as TEFLON may be used. Also PTFE sold as HALON by Allied Corp., FLUON by ICI Americas, Inc. and HOSTAFLON by American Hoechst may be used. The PTFE is preferably purchased as a powder having average particle sizes ranging from approximately 0.2 microns to 5 microns and even larger. The initial size of the PTFE particles is not particularly critical so long as the particles are of sufficient size so that a uniform mixture of PTFE and filler particles can be made. A particularly preferred PTFE powder is TEFLON 7A sold by Dupont Co. and other equivalent general purposes PTFE powders.

The preferred filler materials are relative soft glasses having a Rockwell C hardness of between 10C and 50C. Relatively soft minerals, such as gypsum, calcite or apatite, may also be used as a suitable filler, so long as they have Rockwell C hardness values of between 10C and 50C and are also compatible with PTFE. Although soft minerals may be used as suitable fillers in accordance with the present invention, soft glass particle fillers are preferred. The following description will accordingly be limited to a description of preferred glass filled PTFE embodiments with it being understood that the invention is not limited to these particular embodiments.

Preferred soft glass particles include lead glasses, soda-lead glasses, soda-lime glasses and borosilicate glasses. Any of the commercially available lead, soda-lead and soda-lime glasses may be used. Only those borosilicate glasses with Rockwell C hardness values between 10C and 50C are suitable. One particularly preferred lead glass is a high lead glass available from Corning Glass Works and identified as No. 8463. This high lead glass has a Rockwell C hardness of about 28 and contains a lead oxide content of about 63 weight percent. Any commercially available lead glasses with similar lead contents and physical properties may be used. The lead oxide content of the glass can range from 1 to 70 weight percent with 50 to 70 weight percent being preferred.

The particle size, shape and surface characteristics of the glass particles are important factors which affect the properties of the final soft glass filled PTFE composition. The size of the glass particles may be varied depending upon the intended use of the filled PTFE compound. Glass particles of 0.1 inch diameter and even greater may be used for certain applications. Glass particles ranging in size from a fraction of a micron to 1000 microns are preferred for use in glass filled PTFE bushings, rider rings and seals. Particularly preferred are glass particles which have been crushed and screened through a 325 mesh screen (U.S. standard size). The average particle size of such screened particles is typically from 3–5 microns. Particles of this size range which have passed through a 325 mesh screen are particularly preferred for use in bushing and rider ring type applications where it is desirable to limit wear debris. Further, particles in this size range can be conveniently mixed uniformly with PTFE powder having similar particle sizes to provide a desirable powder mixture which can be easily handled and processed into desired bushings, etc.

The glass particles may be any shape depending upon desired final characteristics of the glass filled PTFE. It is preferred that the glass particles have a random angular shape which generally results from fracturing and crushing larger glass pieces. The surfaces of the glass particles prior to incorporation into the PTFE and sintering will generally include fracture lines, jagged edges and crevices which are desirable to provide good bonding between the PTFE and glass particles.

The amount of glass filler particles incorporated into the PTFE powder is sufficient to provide sintered PTFE which contains between 5 volume percent and 50 volume percent glass particles. Preferably the amount of lead glass filler particles will range from 20 to 50 weight percent while the amounts of soda-lead glass preferably range from 10 to 30 weight percent. The above weight percent ranges for the lead and soda-lead glasses are different due to differences in the densities of the glass. The given weight percentage ranges are designed to provide roughly equivalent preferred volume percent ranges for the two types of glasses.

Preferably, the volume percent of soft glass particles present in the PTFE will parallel the amounts of conventional hard E-type glass used in commercially available hard glass filled PTFE. It is believed that the volume ratio of glass filler to PTFE is the important parameter governing the properties of the material rather than the weight percent. Because of their different densities, powered PTFE mixtures having 25% by weight high lead glass and mixtures having 15% by weight soda-lead glass are both approximately equivalent in volume percent to powered PTFE mixtures having 12%, and 18% respectively by weight Owens-Corning E-Glass. Similarly, 45% by weight high lead glass and 25% by weight soda-lead glass are both equivalent in volume percent to 25%, and 24% respectively by weight Owens-Corning E-Glass. For convenience in mixing and fabricating the glass filled PTFE, weight percents of the glass particles are given rather than volume percents. The densities for the glasses are: high lead 6.22 g/cc, soda-lead 2.79 g/cc, and E-Glass 2.60 g/cc.

The PTFE in powder or granular form, is mixed with suitably sized soft glass particles as is conventionally known and cold compressed at high pressure to form the desired article shape. Certain processing aids, such as naphtha, may be used to form a paste of combined PTFE and soft glass, if desired. The PTFE and soft glass particle mixture is preferably compressed or extruded at pressures around 5000 psi. The compressed PTFE/soft glass mixture is then sintered at a temperature above approximately 620° F. and below the temperature at which the PTFE decomposes or is otherwise adversely affected.

It is particularly preferred, although not necessary, to sinter the PTFE/soft glass mixture at a temperature which is above the annealing point of the glass. For high lead glass which has an annealing point of 685° F., it is preferred that the sintering temperature is above 685° F. The annealing point for soda lead glass is approximately 666° F. Accordingly, it is preferred that the sintering temperature when fabricating PTFE filled seals using these glasses be at or above their respective annealing points. It is believed that sintering the PTFE at temperatures above the annealing point of the soft glass filler provides added adhesion between the glass particles and PTFE to improve structural strength of the sintered product.

The melting point of lead is approximately 621° F. In a preferred embodiment using lead or soda-lead glass, it is desirable to maintain the sintering temperature above the melting point of lead and provide a reducing atmosphere, i.e., devoid of oxygen, in the sintering oven to thereby allow the lead oxide in the lead glass to be reduced to metallic lead. This provides localized concentrations of metallic lead or gradient distribution of metallic lead in the article which can be very useful where variable structural characteristics are desired at different locations in a single article.

In another preferred embodiment, the cold compressed mixture of PTFE and lead glass particles is sintered as above where the temperature is above the melting point of lead and the annealing point of the glass; however, the atmosphere in the sintering oven is oxygen rich, i.e., an oxidizing atmosphere, to prevent the lead oxide from being reduced to metallic lead and migrating in accordance with the previous embodiment.

In general, sintering temperature between 690° F. and 710° F. are preferred for sintering the soft glasses. Lower sintering temperature may be used in the neighborhood of 665° F. where it is desired to limit the amount of metallic lead formed during the sintering process. Sintering times are not critical so long as the glass particles and PTFE have sufficient time to interact and form a suitable final product. Typical sintering times should be on the order of 1 to 4 hours.

Examples of practice are as follows:

Four examples of soft glass filled PTFE were prepared using TEFLON TFE 7A powder and Corning No. 8463 high lead glass particles and Corning No. 0010 soda-lead glass particles. The glass particles were fractured and crushed sufficiently to pass through a 325 mesh screen (U.S. standard size). The TEFLON powder and glass particles were mixed to provide the following solids blends:

(1) 25 weight percent high lead glass in PTFE
(2) 45 weight percent high lead glass in PTFE
(3) 15 weight percent soda-lead glass in PTFE
(4) 25 weight percent soda-lead glass in PTFE The above four solids blends were fabricated according to conventional and well known PTFE processing techniques involving first blending the powdered glass with the powdered Teflon. Then, the blended powder was pressured into a rod 1¼ inches in diameter at 5,000 psi and then heated in an oven for 2 hours to a maximum temperature of 710° F.

The resulting sintered PTFE rods had the following volume percents of glass filler particles:

(1) 10 volume percent high lead glass
(2) 22 volume percent high lead glass
(3) 19 volume percent soda-lead glass
(4) 20 volume percent soda-lead glass The properties of the exemplary soft glass seal materials are shown in Table 1. The 25% High Lead glass filler actually caused an unexpected increase in both the tensile strength and percent elongation over pure TEFLON (see Table II).

TABLE I

| FILLER | DIRECTION of MEASUREMENT | TENSILE STRENGTH ASTM D-1457 | ELONGATION ASTM D-1457 | SPECIFIC GRAVITY ASTM D-1457 |
| --- | --- | --- | --- | --- |
| 25% High Lead | Cross | 3705 | 331 | 2.65 |
|  | Mold | 3272 | 301 |  |
| 45% High Lead Glass | Cross | 2508 | 248 | 3.10 |
|  | Mold | 2142 | 242 |  |
| 15% Soda-Lead Glass | Cross | 3202 | 272 | 2.25 |
|  | Mold | 2643 | 260 |  |
| 25% Soda-Lead Glass | Cross | 2355 | 255 | 2.26 |
|  | Mold | 1757 | 108 |  |
| 45% High Lead Glass (with metallic lead) | Mold | 2118 | 57 |  |

TABLE II

| FILLER | DIRECTION of MEASUREMENT | TENSILE STRENGTH ASTM-D-1457 (psi) | ELONGATION ASTM-D-1457 (%) | SPECIFIC GRAVITY ASTM-D-1457 |
|---|---|---|---|---|
| None (pure Teflon) | Cross | 3500 | 300 | 2.15 |
| 15% E glass | Cross | 2800 | 250 | 2.20 |
| 25% E glass | Cross | 2200 | 150 | 2.22 |
| 15% E glass/5MoS$_2$ | Cross | 3200 | 280 | 2.28 |
| 60% Bronze | Cross | 2000 | 90 | 3.97 |
| 20% E glass/20MoS$_2$ | | 2400 | 70 | 2.51 |

In general, all of the new soft glass materials provide PTFE composites with tensile strengths that are equivalent or superior to comparable loadings for other conventional filler materials in PTFE. For comparison, the properties of some similar seal materials are shown in Table II. Pure Teflon has the highest tensile strength and greatest percent elongation. The addition of conventional filler materials causes these properties to decrease; however, the conventional fillers do add to or enhance other properties such as resistance to creep.

The 710° F. sintering temperature used in the fabrication of the soft glass loaded PTFE exemplary rods is, as previously mentioned, above both the 685° F. annealing point of the high lead glass and the 621° F. melting point of lead. Some lead melted out of the high lead glass filler particles. The melted lead formed in the center of the rods and on cooling a dark colored center core was formed by lead solidifying in the interstices of the central portion of the rod. As previously mentioned, this phenomena can be controlled by regulating the oxygen content of the sintering oven atmosphere and/or reducing sintering temperature. This effect was observed to some extent by both of the high lead glass filled materials; however, the 45% high lead glass filled PTFE material had, by far, the largest dark core. A sample of this material was removed from the rod and the physical properties measured. They are reported at the bottom of Table I. The tensile strength is quite good; however, the elongation is greatly reduced by the pressure of the metallic lead.

A second exemplary group of soft glass filled PTFE rods were fabricated in exactly the same manner as in the previous examples with one exception. The rods were put in the oven for four (4) hours and heated to a maximum temperature not to exceed 665° F. The properties of the material are only slightly different from those of the first set of rods and are shown in Table III. However, none of the high lead glass filled materials formed the dark cores associated with sintering at a higher temperature.

particular soft glass used as the filler be at least 10C less than the hardness of the surface against which the material moves. By limiting the hardness of the soft glass filled PTFE, in this way, the amount of wear debris which is generated is lowered drastically. For example, carbon steels are common material between which glass filled PTFE is used as seals and rider rings. The Rockwell C hardness of carbon steels in general ranges from 20 to 65. A typical configuration includes a carbon steel first member having a first sealable surface and a carbon steel second member having a second sealable surface. The filled PTFE material is used as a sealing material which is located between the two sealable surfaces. The surfaces can be movable relative to each other. In accordance with the present invention, the Rockwell C hardness of the soft glass filler must be at least 10C less than the hardness of the particular carbon steel against which the PTFE material rubs or slides. The same rule holds true for other metals and metal alloys, i.e., the glass filler should have a Rockwell hardness of at least 10C less than the metal or alloy.

Examples of the improved wear characteristics and low debris generation of the soft glass filled PTFE compounds in accordance with the present are as follows:

Wearing testing was conducted using standard procedures for reciprocating wear testing. The wear surface was Inconel 718 with a 4 to 8 microinch arithmetic average surface roughness. The Rockwell C hardness of the Inconel 718 wear surface is 23–25. Test samples were machined from the PTFE filled with 25 weight percent high lead glass particles disclosed in the previous examples (Compound (1)). Comparison test samples were made from PTFE filled with E-Glass (Fluorogold ™), Delrin ™, Lennite and Rulon J. The test samples were machined into hollow cylinders. The wear testing was performed using standard practice, using the test conditions shown in Tables IV and V. The test results are shown in the tables. The soft lead glass material initially exhibits a break-in wear rate which is

TABLE III

| FILLER | DIRECTION of MEASUREMENT | TENSILE STRENGTH ASTM D-1457 | ELONGATION ASTM D-1457 | SPECIFIC GRAVITY ASTM D-1457 |
|---|---|---|---|---|
| 25% High Lead Glass | Cross | 3726 | 287 | 2.60 |
|  | Mold | 3464 | 302 |  |
| 45% High Lead Glass | Cross | 2661 | 244 | 3.01 |
|  | Mold | 2233 | 245 |  |
| 15% Soda-Lead Glass | Cross | 3264 | 248 | 2.23 |
|  | Mold | 2736 | 244 |  |
| 25% Soda-Lead Glass | Cross | 2688 | 207 | 2.22 |
|  | Mold | 1636 | 79 |  |

When the soft glass filled PTFE materials are used as a bushing, rider ring, seal or other type of article where it is subjected to frictional contact with various surfaces, it is preferred that the Rockwell C hardness of the higher than the subsequent steady state wear rate. However, both the overall wear rate and steady state wear rate are superior to PTFE filled with 25% E-Glass fibers (Fluorogold TM) by more than a factor of 3. It should be noted that since high lead glass has a specific gravity which is greater than E-Glass, weight loss values for the PTFE filled with high lead glass when compared to PTFE filled with E-Glass are 16% higher than if the wear values were determined and a comparison to E-Glass made based on lost volume as opposed to lost weight. The wear values for the other materials are included for comparison to wear rates for the glass filled PTFE, (i.e., Compound 1 and Fluorogold). These materials in general are expected to have better wear characteristics than the glass filled PTFE compositions.

when the PTFE filled with soft glass is used in place of E-Glass/PTFE composite.

Seals and rider rings were made from both the PTFE filled with 25 weight percent high glass and PTFE filled with 15 weight percent chopped E-Glass fibers. The E-Glass fibers were 0.0005 inch in diameter and 0.005 inch long. These seals and rider rings were assembled in cryo-cooler compressor units and their performance observed. The performance of the PTFE filled with soft glass was equal to or surpassed the performance of the PTFE seals and rings filled with E-Glass. In addition, the amount of wear debris generated by the PTFE seals and rings filled with soft glass was significantly less than that generated by the PTFE filled with E-Glass.

TABLE IV

| MATERIAL | TEST DURATION 1,000 CYCLES | DIMENSIONAL LOSS,[1] Inches/1000 Cycles, $(\times 10^5)$ | | WEIGHT LOSS mg/g/1000 Cycles, $(\times 10^3)$ | | COUNTER SURFACE DESCRIPTION |
|---|---|---|---|---|---|---|
| | | 0-End | 11,000-End | 0-End | 11,000-End | |
| Compound 1 | 125.4 | 3.20 | 1.00 | 12.8 | 3.1 | Inconel 718, 4–8 microinch AA |
| Compound 1 | 125.4 | 2.90 | 0.64 | 11.3 | 2.3 | Inconel 718, 4–8 microinch AA |
| Fluorogold | 121.1 | 11.40 | 7.50 | 14.0 | 8.0 | Inconel 718, 4–8 microinch AA |
| Fluorogold | 122.4 | 7.40 | 2.60 | 7.6 | 6.6 | Inconel 718, 4–8 microinch AA |
| Delrin AF | 141.3 | 0.21 | 0.13 | 3.0 | 1.0 | Inconel 718, 4–8 microinch AA |
| Delrin AF | 132.7 | 0.40 | 0.38 | 6.3 | 4.9 | Inconel 718, 4–8 microinch AA |
| Lennite | 120.5 | 3.70 | 1.70 | 0.7 | 0.9 | Inconel 718, 4–8 microinch AA |
| Lennite | 127.5 | 4.10 | 1.70 | 0.3 | 0.1 | Inconel 718, 4–8 microinch AA |
| Rulon J | 124.5 | 2.00 | 0.91 | 5.3 | 1.7 | Inconel 718, 4–8 microinch AA |

[1]NOTE:
Dimensional losses measured directly from wear specimens.
P = 600 PSI,
V = 17.2 FRM (95 CPM),
ATMOSPHERE = NOMINAL HELIUM

TABLE V

| MATERIAL | TEST DURATION 1,000 CYCLE | (hours) | DIMENSIONAL LOSS,[1] Inches/1000 Cycles, $(\times 10^6)$ | | WEIGHT LOSS mg/g/1000 Cycles, $(\times 10^3)$ | | COUNTER SURFACE DESCRIPTION |
|---|---|---|---|---|---|---|---|
| | | | OVERALL | STEADY-STATE | OVERALL | STEADY-STATE | |
| Compound 1 | 2,060.1 | (981) | 0.36 | 0.23 | 0.87 | 0.55 | Inconel 718, 4–8 microinch AA |
| Flurogold | 2,589.3 | (1233) | 1.89 | 1.89 | 4.63 | 4.63 | Inconel 718, 4–8 microinch AA |
| PTFE/40% 412 Bronze/5% MoS$_2$ | 2,450.7 | (1,167) | 0.17 | 0.11 | 0.53 | 0.38 | Inconel 718, 4–8 microinch AA |
| PTFE/40% B408 Bronze/5% MOS$_2$ | 2,530.5 | (1,205) | 0.21 | 0.15 | 0.49 | 0.36 | Inconel 718, 4–8 microinch AA |

NOTE: Dimensional loss computed from weight loss as follows:
Dimensional loss (inches) = weight loss (grams)/density (grams/cm$^3$)/2.54 cm/in)$^3$(0.156 in$^2$)
NOTE: Density for soft-seal and material = 2.5 grams/cm$^3$ (estimated).
NOTE: Density of Fluorogold = 2.2 grams/cm$^3$.
P = 191 PSI,
V = 12.6 FPM (35 CPM),
ATMOSPHERE = NOMINAL HELIUM As is apparent from the above examples, the soft glass filled PTFE in accordance with the present invention provides an improved compound which is structurally stronger than conventional PTFE composite materials made from PTFE filled with E-Glass and further provides significant reductions in wear debris generated

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein and is only limited by the following claims.

What is claimed is:

1. A composition of matter comprising: sintered polytetrafluoroethylene having uniformly dispersed therein from 5 to 50 volume percent of filler particles selected from the group consisting of glass particles and mineral particles having a Rockwell C hardness of between about 10C to 50C wherein said filler particles are present in the polytetrafluoroethylene when the sintering occurs.

2. A composition of matter according to claim 1 wherein said filler particles are glass.

3. A composition of matter according to claim 2 wherein said glass is lead glass, soda-lead glass, soda-lime glass or borosilicate glass.

4. A composition of matter according to claim 1 wherein said mineral is gypsum, calcite or apatite.

5. A composition of matter according to claim 1 wherein said filler particles are sufficiently small to pass through a screen having a mesh size of 325.

6. A composition of matter according to claim 5 wherein said particles have a random angular shape.

7. A composition of matter according to claim 1 wherein said filler particles are lead glass.

8. A composition of matter according to claim 7 wherein said lead glass contains from 1 to 70 weight percent lead oxide.

9. A composition according to claim 7 wherein said lead glass contains from 50 to 70 weight percent lead oxide.

10. A composition of matter according to claim 7 wherein said sintered polytetrafluoroethylene contains from 20 to 50 weight percent lead glass.

11. A composition of matter according to claim 1 wherein said sintered polytetrafluoroethylene contains from 10 to 30 weight percent soda-lead glass.

12. A composition of matter according to claim 2 wherein the sintering temperature of the polytetrafluoroethylene is above the annealing point of said glass.

13. A composition of matter according to claim 12 wherein said glass is lead glass, soda-lead glass, soda-lime glass or borosilicate glass.

14. A composition of matter comprising: sintered polytetrafluoroethylene having uniformly dispersed therein from 5 to 50 volume percent of filler particles selected from the group consisting of glass particles having a Rockwell C hardness of between about 10C to 50C wherein said filler particles are present in the polytetrafluoroethylene when the sintering occurs and wherein the temperature of said sintering is above the annealing point of said glass.

15. A composition of matter according to claim 14 wherein said glass is lead glass or soda-lead glass and said sintering temperature is above the melting point of lead and wherein the polytetrafluoroethylene is maintained at the sintering temperature for a sufficient time and the atmosphere surrounding said polytetrafluoroethylene is sufficiently oxygen free to form metallic lead within said sintered polytetrafluoroethylene.

16. A composition of matter according to claim 15 wherein sufficient oxygen is provided in the atmosphere surrounding said polytetrafluoroethylene during the sintering to prevent the lead oxide in said lead glass or soda-lead glass from forming metallic lead.

17. In a seal assembly including a first member having a first sealable surface, said first surface having a first Rockwell hardness, a second member having a second sealable surface located in sealing relation to said first sealable surface, said second surface having a second Rockwell hardness, said seal assembly further including sealing material located between said first and second sealable surfaces to provide a seal therebetween, wherein the improvement comprises:
sealing material comprising a sintered polytetrafluoroethylene having uniformly dispersed therein from 5 to 50 volume percent of glass filler particles having a Rockwell C hardness of between about 10C to 50C wherein said filler particles are present in the polytetrafluoroethylene when the sintering occurs and wherein the temperature of said sintering is above the annealing point of said glass filler particles.

18. An improved seal assembly according to claim 17 wherein said glass is lead glass, soda-lead glass, soda-lime glass or borosilicate glass.

19. An improved seal assembly according to claim 17 wherein said first and second members are made from material having a Rockwell C hardness of from 20 to 65.

20. An improved seal assembly according to claim 19 wherein said first and second members are made of carbon steel.

* * * * *